United States Patent
Hamada

(10) Patent No.: US 9,936,142 B2
(45) Date of Patent: Apr. 3, 2018

(54) EXPOSURE CONTROL APPARATUS AND EXPOSURE CONTROL METHOD

(71) Applicant: OLYMPUS CORPORATION, Hachioji-shi, Tokyo (JP)

(72) Inventor: Takashi Hamada, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 5 days.

(21) Appl. No.: 15/184,528

(22) Filed: Jun. 16, 2016

(65) Prior Publication Data

US 2016/0373636 A1 Dec. 22, 2016

(30) Foreign Application Priority Data

Jun. 18, 2015 (JP) ................................. 2015-122673

(51) Int. Cl.
*H04N 5/235* (2006.01)
*G03B 7/00* (2014.01)
*H04N 5/14* (2006.01)

(52) U.S. Cl.
CPC ......... *H04N 5/2351* (2013.01); *H04N 5/2352* (2013.01); *H04N 5/144* (2013.01)

(58) Field of Classification Search
CPC ...... H04N 5/235; H04N 5/2354; H04N 5/351; H04N 5/2351; H04N 5/353; H04N 5/2353
See application file for complete search history.

(56) References Cited

U.S. PATENT DOCUMENTS

| 9,648,251 | B2* | 5/2017 | Pouli | H04N 5/265 |
|---|---|---|---|---|
| 2008/0101786 | A1* | 5/2008 | Pozniansky | H04N 5/2354 396/159 |
| 2010/0265342 | A1* | 10/2010 | Liang | H04N 5/145 348/208.4 |
| 2011/0193990 | A1* | 8/2011 | Pillman | H04N 5/23245 348/229.1 |
| 2012/0177352 | A1* | 7/2012 | Pillman | H04N 5/2354 396/61 |
| 2014/0198226 | A1* | 7/2014 | Lee | H04N 5/2355 348/208.1 |

FOREIGN PATENT DOCUMENTS

JP H06-245139 A 9/1994

* cited by examiner

*Primary Examiner* — Kelly L Jerabek
(74) *Attorney, Agent, or Firm* — Volpe and Koenig, P.C.

(57) ABSTRACT

An exposure control apparatus comprising: a local motion detection section which detects a local motion in a screen; a brightness detection section which detects a subject brightness; a local motion brightness determination setting section which sets a local motion brightness determination value for a local motion; and an exposure adjustment section which, when the local motion detection section has detected a motion corresponding to or exceeding a predetermined value, subsequently performs exposure control until the local motion brightness determination value is reached and, when the exposure has come closer to an appropriate exposure than the local motion brightness determination value, adjusts the exposure to a predetermined exposure value which is different from the appropriate exposure.

8 Claims, 4 Drawing Sheets

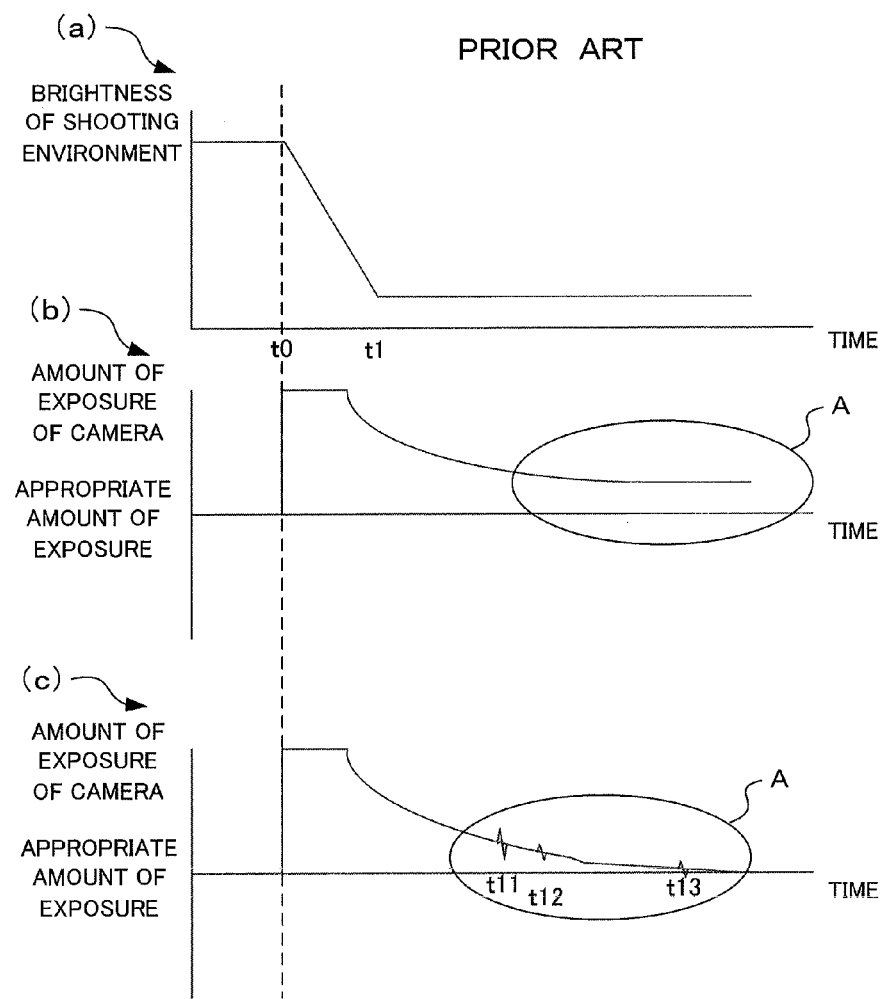

EXPOSURE CONTROL APPARATUS AND EXPOSURE CONTROL METHOD

CROSS-REFERENCE TO RELATED APPLICATIONS

Benefit is claimed, under 35 U.S.C. § 119, to the filing date of prior Japanese Patent Application No. 2015-122673 filed on Jun. 18, 2015. This application is expressly incorporated herein by reference. The scope of the present invention is not limited to any requirements of the specific embodiments described in the application.

BACKGROUND OF THE INVENTION

1. Field of the Invention

The present invention relates to an exposure control apparatus and an exposure control method which measure the subject brightness and perform exposure control in an imaging device or the like.

2. Description of Related Art

An imaging device such as a camera controls the shutter speed value, aperture value, ISO sensitivity value or the like on the basis of the result of measurement of the subject brightness so as to perform exposure near the appropriate exposure. During video shooting, the brightness of the field may vary over time, or the subject itself may vary. There is proposed an imaging device which always reproduces brightness and darkness faithfully in accordance with such variation (see Japanese Patent Laid-Open No. 06-245139 (hereafter referred to as "Patent Literature 1")).

The imaging device disclosed in Patent Literature 1 analyzes the situation of the variation of the subject on the basis of the variation of the image signal level, and adjusts the amount of exposure by controlling the aperture value on the basis of the analysis result. Adjusting the amount of exposure allows faithful reproduction of brightness and darkness.

The imaging device disclosed in Patent Literature 1 maintains the aperture value or drives the aperture so as to achieve the appropriate exposure, in accordance with the variation of the shooting scene. However, Patent Literature 1 does not take into account the brightness variation that occurs near the appropriate exposure due to exposure control when shooting a video.

Referring to FIG. 4, brightness variation that occurs near the appropriate exposure due to exposure control will be described. The graph (a) illustrated at the upper part of FIG. 4 indicates temporal variation of the brightness of the shooting environment, with the brightness staying at BV0 until a time point t0 and falling to a brightness BV1 between time points t0 and t1 in the example. Under such a situation, when the brightness of the shooting environment starts falling at the time point t0, the amount of exposure of the camera slowly follows the falling from an amount of exposure EV1. Although the amount of exposure falls slowly as described above, there is no exposure control performed to obtain the appropriate amount of exposure EV0.

It is originally ideal to perform exposure control to the appropriate exposure level. However, the conventional method of varying the exposure using the current aperture, shutter speed and ISO sensitivity does not exhibit sufficient performance of the exposure control system. Accordingly, as indicated by the time points t11, t12 and t13 in the graph (c) illustrated at the lower part of FIG. 4, occurrence of disorder (see the region with a symbol A in the graph (c)) in the exposure control value (for example, aperture value) provides the human eye with flickers or a sense of discomfort. The sense of discomfort or the like tends to be outstanding near the appropriate exposure value. Accordingly, as described above, the exposure is not controlled until the appropriate amount of exposure is achieved when varying the amount of exposure (see the region with the symbol A in the graph (b) illustrated at the middle part of FIG. 4).

SUMMARY OF THE INVENTION

It is an object of the present invention to provide an exposure control apparatus and an exposure control method capable of performing appropriate exposure control in accordance with the variation of the shooting scene.

An exposure control apparatus according to a first aspect of the present invention comprising: a local motion detection section which detects a local motion in a screen; a brightness detection section which detects a subject brightness; a local motion brightness determination setting section which sets a local motion brightness determination value for a local motion; and an exposure adjustment section which, when the local motion detection section has detected a motion corresponding to or exceeding a predetermined value, subsequently performs exposure control until the local motion brightness determination value is reached and, when the exposure has come closer to an appropriate exposure than the local motion brightness determination value, adjusts the exposure to a predetermined exposure value which is different from the appropriate exposure.

An exposure control apparatus according to a second aspect of the present invention comprising: an overall motion detection section which detects an overall motion in a screen; a local motion detection section which detects a local motion in the screen; and an exposure control section which performs exposure control until an appropriate amount of exposure is reached when a motion detected by the overall motion detection section corresponds to or exceeds a predetermined value, or performs exposure control until the exposure becomes over or under relative to the appropriate amount of exposure by a predetermined amount when a motion detected by the local motion detection section corresponds to or exceeds a predetermined value, and subsequently stops the exposure control.

An exposure control method according to a third aspect of the present invention comprising: detecting a local motion in a screen; detecting a subject brightness; setting a local motion brightness determination value for the local motion; and when the local motion corresponds to or exceeds a predetermined value, subsequently performing exposure control until an amount of exposure reaches the local motion brightness determination value and, when the amount of exposure has come closer to an appropriate exposure than the local motion brightness determination value, adjusting the exposure to a predetermined exposure value which is different from the appropriate exposure.

BRIEF DESCRIPTION OF THE DRAWINGS

FIG. 4 is a graph illustrating exposure control in a conventional camera.

DETAILED DESCRIPTION OF THE PREFERRED EMBODIMENTS

In the following, an example applied to a digital camera as an embodiment of the present invention will be described. The digital camera has an imaging section which converts a subject image into image data and, on the basis of the converted image data, performs live-view display of the subject image on a display section provided on the back side of the main body. The photographer determines the composition and shutter timing by observing live-view display. Image data of a still picture is stored in a storage medium when a release button is operated, whereas image data of a video is stored when a video button is operated. The image data stored in the storage medium can be reproduced and displayed on the display section when the reproduction mode is selected.

Figure 3:
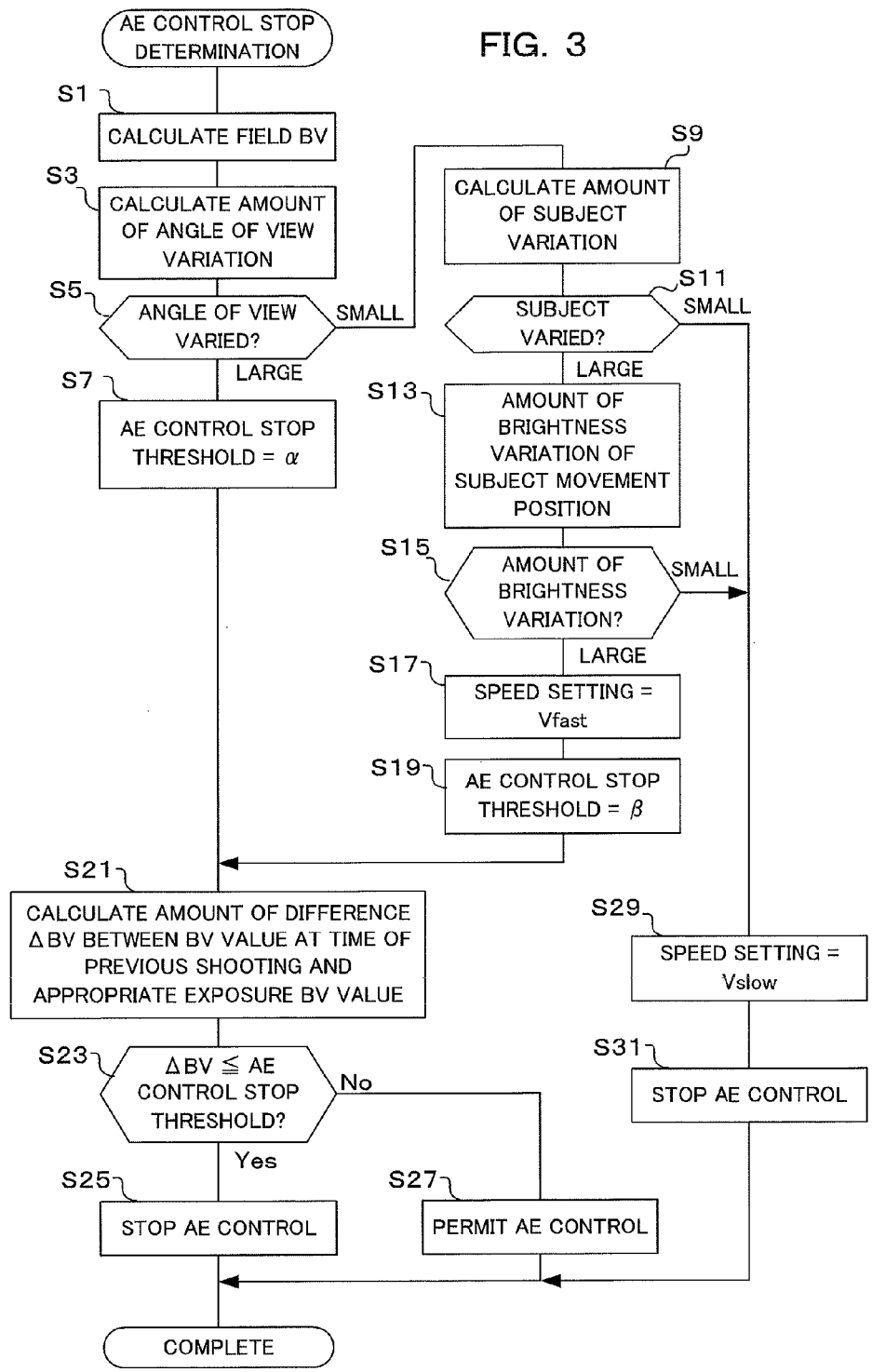
FIG. 3 is a flowchart illustrating an operation of AE control stop determination of the camera according to an embodiment of the present invention.

Additionally, in the present embodiment, an amount of overall movement of a camera is detected and, when the amount of movement is larger than a determination value, an AE control section performs exposure control to the vicinity of the appropriate exposure (see, for example, S7, S21, S23, and S27 of FIG. 3). When, on the other hand, the overall amount of movement of the camera is smaller than the determination value and when some of the subjects in the screen are locally moving, the AE control section stops the exposure control (see, for example, S11, S19, S21, S23 and S25 of FIG. 3).

Figure 1:
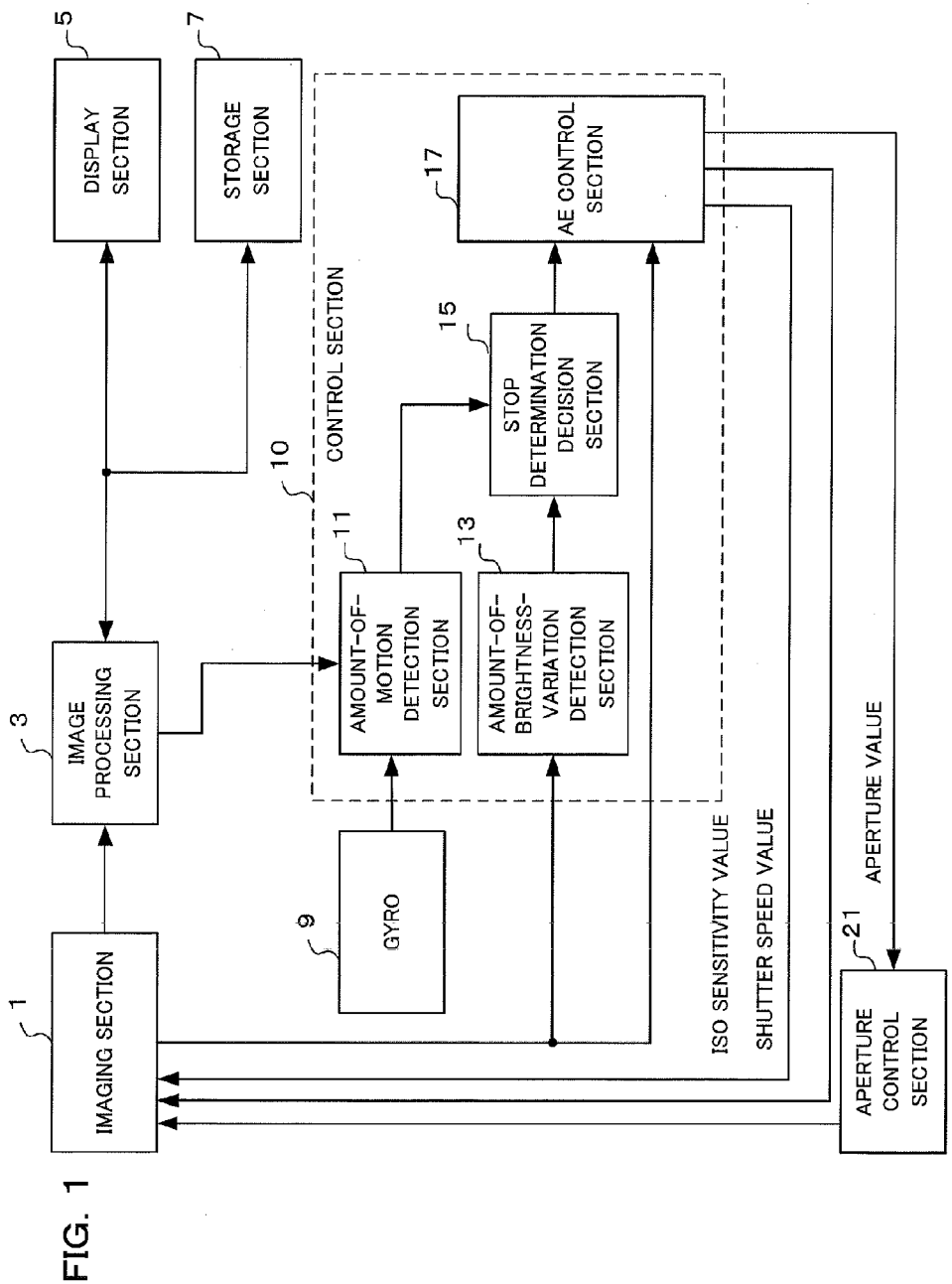
FIG. 1 is a block diagram illustrating mainly an electrical structure of a camera according to an embodiment of the present invention.

FIG. 1 is a block diagram illustrating mainly an electrical structure of a camera according to an embodiment of the present invention. An imaging section 1 has an optical system which forms a subject image, an aperture which limits subject light flux passing through the optical system, an image sensor which converts the subject image formed by the optical system into image data, and an imaging drive circuit or the like which reads the image data from the image sensor and outputs the image data to an image processing section 3 and an amount-of-brightness-variation detection section 13.

The image processing section 3, having an image processing circuit, performs a variety of image processing, on image data input from the imaging section 1, such as image processing for live-view display on a display section 5, image processing for storage on a storage section 7, image processing for reading image data from the storage section 7 and reproducing and displaying the image data on the display section 5. In addition, the image processing section 3 outputs image data for detecting a local motion of a subject within a subject image to an amount-of-motion detection section 11 during live-view display. The display section 5 has a monitor such as an LCD (Liquid Crystal Display) or an organic EL (Organic Electroluminescent Display), and displays images. The storage section 7 stores image data in a storage medium that can be loaded on a camera.

A gyro 9 detects a motion applied on the camera, and outputs the detection result to the amount-of-motion detection section 11. For example, a motion of the camera caused by shaking of the photographer's hand, or a motion intentionally performed by the photographer such as panning or tilting is detected. Note that, without being limited to a gyro, any sensor capable of detecting a motion of the camera may be used such as an angular acceleration sensor or a 6-axis sensor. The gyro 9 functions as an overall motion detection section which detects an overall motion in the screen.

A control section 10 includes a CPU (Central Processing Unit) and a peripheral circuit thereof (including, for example, an ASIC (Application Specific Integrated Circuit), and controls the entire camera. The CPU operates according to a program stored in a non-volatile memory such as a flash ROM which is not illustrated.

The control section 10 functions as a local motion brightness determination setting section which sets a local motion brightness determination value for a local motion (see, for example, setting of AE control stop threshold in S7 and S19 of FIG. 3). In addition, the control section 10 functions as an exposure adjustment section which, when the local motion detection section has detected a motion corresponding to or exceeding a predetermined value, subsequently performs exposure control until the local motion brightness determination value is reached and, when the exposure has come closer to an appropriate exposure than the local motion brightness determination value, adjusts the exposure to a predetermined exposure value which is different from the appropriate exposure (see, for example, S5 "small", S11 "large", and S19 to S27 of FIG. 3).

The control section 10 functions as an overall motion brightness determination setting section which sets an overall motion brightness determination value with regard to detection of an overall motion (see, for example, S7 of FIG. 3). The control section 10 functions as an exposure adjustment section which, when the overall motion detection section has detected a motion corresponding to or exceeding a predetermined value, subsequently performs exposure adjustment until the overall motion brightness determination value is reached (see, for example, S5 "large", S7, and S21 to S27 of FIG. 3). In addition, letting $\alpha$ be the overall motion brightness determination value and $\beta$ be the local motion brightness determination value, a relation $\alpha > \beta$ holds.

The control section 10 functions as an exposure adjustment section which performs exposure control by lowering the exposure adjustment resolution per unit time when the exposure has come closer to an appropriate exposure than the local motion brightness determination value (see S17 and S29 of FIG. 3). The control section 10 functions as an exposure adjustment section which switches the exposure adjustment resolution per unit time in accordance with the detection result by the local motion detection section (see S17 and S29 of FIG. 3).

The control section 10 functions as an exposure adjustment section which, when the local motion detection section has detected a motion corresponding to or exceeding a predetermined value, subsequently performs exposure control for a first time period and, after the first time period, performs exposure control for a second time period.

The control section 10 functions as an exposure control section which performs exposure control until an appropriate amount of exposure is reached when a motion detected by the overall motion detection section corresponds to or exceeds a predetermined value (see, for example, S5 "large", S7 and S21 to S27 of FIG. 3), or performs exposure control until the exposure becomes over or under relative to the appropriate amount of exposure by a predetermined amount when a motion detected by the local motion detection section corresponds to or exceeds a predetermined value, and subsequently stops exposure control (see, for example, S5 "small" and S19 to S27 of FIG. 3).

The control section 10 has the amount-of-motion detection section 11, the amount-of-brightness-variation detection section 13, a stop determination decision section 15, and an AE control section 17. Each of the sections may be configured as hardware such as an ASIC, or may be implemented as software by the CPU and programs, or a part may be configured as hardware with the rest being implemented as software. Furthermore, each part in the control section 10 may be configured as hardware such as a gate circuit generated on the basis of a programming language written in Verilog, or hardware using software such as a DSP (Digital Signal Processor). It goes without saying that the foregoing components may be combined as appropriate.

The amount-of-motion detection section 11 detects the amount of motion of the entire camera on the basis of the detection output of the gyro 9. In addition, the amount-of-motion detection section 11 detects the amount of motion of a local movement, if any, in the subject image, on the basis of the image data from the imaging section 1 and the image processing section 3. The amount of local motion is calculated by dividing the image into a plurality of blocks, and detecting for each block the degree of match between images in a block at different time points. The amount-of-motion detection section 11 functions as a local motion detection section which detects a local motion in the screen.

The amount-of-brightness-variation detection section 13 calculates the brightness value on the basis of the image data output from the imaging section 1, calculates the amount of temporal variation of the brightness value on the basis of the calculated brightness value, and outputs to the stop determination decision section 15. The amount-of-brightness-variation detection section 13 functions as a brightness detection section which detects the subject brightness.

The stop determination decision section 15 receives input of the amount of motion of the entire camera and the amount of local motion of the subject from the amount-of-motion detection section 11, and receives input of the amount of brightness variation from the amount-of-brightness-variation detection section 13. The stop determination decision section 15 then determines whether to permit or stop exposure control (AE control) using the ISO sensitivity, shutter speed and aperture, by comparing the input values and the determination value (see S25, S27 and S31 of FIG. 3). It suffices that the determination value used for the determination is effective for detecting a variation of the brightness caused by a local movement of the subject within the angle of view, as will be described below (FIG. 2B and S15 of FIG. 3).

The AE control section 17 calculates the brightness value based on the image data from the imaging section 1, and calculates the ISO sensitivity value, the shutter speed value (electronic shutter speed value or mechanical shutter speed value), and the aperture value that achieve an appropriate exposure, on the basis of the brightness value. When a part of the values have been set by the photographer, other exposure control values are calculated on the basis of the setting values. When the determination result which has been input from the stop determination decision section 15 indicates continuation of AE control (AE control is permitted), the AE control section 17 outputs the ISO sensitivity value and shutter speed value to the imaging section 1, and outputs the aperture value to the aperture control section 21. The imaging section 1 and the aperture control section 21 perform exposure control according to the values.

The aperture control section 21 has an aperture drive mechanism and an aperture drive circuit and controls the aperture in the imaging section 1 according to the aperture value from the AE control section 17.

Figure 2:
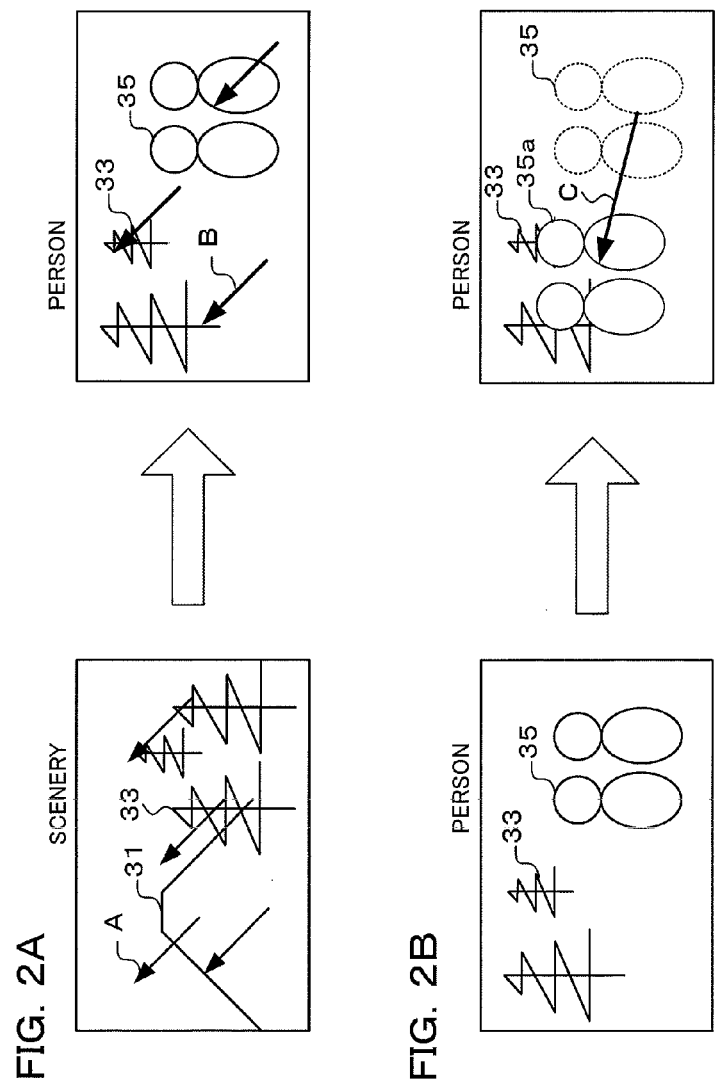
FIGS. 2A and 2B are explanatory diagrams of exposure control in a camera according to an embodiment of the present invention.

Next, the AE control according to the present embodiment will be outlined, referring to FIGS. 2A and 2B. FIG. 2A illustrates a case where the subject is not moving, but the photographer is intentionally moving the camera. In the example, a mountain 31 and a tree 33 forming a part of the scenery are both moving in a movement direction A of the camera, and the tree 33 and a person 35 are also moving in a movement direction B of the camera. The amount of motion is detected by the gyro 9 as an amount of variation of the entire shooting angle of view.

When, as illustrated in FIG. 2A, the entire shooting angle of view is moving, exposure control is performed to the vicinity of the appropriate exposure (see S27 of FIG. 3). In such a case, even if the exposure control value (for example, aperture value) is disordered when the exposure control value is controlled until the appropriate exposure is achieved, the human eye can also perceive that the angle of view and brightness has significantly varied and therefore does not notice the variation of the brightness of the image due to disorder of exposure control. Accordingly, the photographer feels that an exposure control is being performed in a natural manner.

FIG. 2B illustrates a case where the subject within the angle of view is moving when the photographer is not intentionally moving the camera. In the example, the tree 33 in the background is not moving but only the person 35 is moving in a movement direction C. In other words, the person is moving from the position of the person 35 to the position of the person 35a. The amount of motion is detected by the amount-of-motion detection section 11 as the amount of variation in the shooting angle of view on the basis of the image data.

When, as illustrated in FIG. 2B, the subject is moving within the shooting angle of view, exposure control is not performed to the appropriate exposure. In other words, exposure control is stopped when the amount of exposure is within a range shifted from the appropriate amount of exposure by a predetermined amount of exposure, whereas exposure control is permitted when the amount of exposure is out of a range of predetermined amount of exposure. As shown in the example, when only an object within the angle of view is moving with the angle of view being constant, the human eye perceives that the scene has little variation and thus performing exposure control until the appropriate exposure is achieved causes the variation of brightness of the image due to disorder of exposure control to be a nuisance, which may be perceived as an unnatural exposure control. In the present embodiment, therefore, exposure control is not performed until the appropriate amount of exposure is reached in such a case, and exposure control is stopped when a predetermined amount of exposure around the appropriate amount of exposure is reached (see S31 of FIG. 3)

Next, an operation of AE control stop determination according to the present embodiment will be described, referring to the flowchart illustrated in FIG. 3. The flow is executed by the CPU in the control section 10, which controls each section in the camera according to a program stored in a memory (not illustrated).

Although not illustrated in the flow, the ISO sensitivity value, the shutter speed value, and the aperture value that achieve the appropriate exposure are calculated in the control section 10, and AE control (exposure control) is performed on the electronic shutter, the aperture, or the like in the imaging section 1, on the basis of the calculation result. The flow illustrated in FIG. 3 determines whether to permit (perform) or stop the AE control.

When the flow illustrated in FIG. 3 starts, the field BV is first calculated (S1) Here, the amount-of-brightness-variation detection section 13 calculates the brightness value BV of the field on the basis of the image data from the imaging section 1.

After the calculation of the field BV, the amount of angle of view variation is calculated next (S3). Here, the amount-of-motion detection section 11 detects the amount of variation of the entire shooting angle of view on the basis of the detection result from the gyro 9. In calculation of the amount of variation, the amount of movement between frames is calculated in synchronization with the frame rate of video recording or the waiting frame rate.

After the calculation of the amount of angle of view variation, it is next determined whether or not the angle of view has varied (S5). Here, the determination is performed on the basis of whether or not the amount of variation of the entire shooting angle of view calculated at step S3 is larger than the first determination value. In other words, the angle of view is determined to have varied at a time point when a certain amount of variation is reached or exceeded, with the first frame at a time point of operation start being a reference. In addition, when the angle of view has varied, the reference frame position and the amount of variation are reset, and detection is performed with the angle of view being a reference. Since AE control is performed until the appropriate exposure is achieved when the amount of variation of the entire shooting angle of view is large, the first determination value may be determined as appropriate taking into account the adaptability of the human eye to the brightness variation. When the shooting lens is a zoom lens, the determination value may be altered in accordance with the focal length.

In addition, when the angle of view variation is determined, it is detected whether or not zoom operation has been performed and, when the angle of view conversion has varied due to performing the zooming, it is determined that the angle of view has varied regardless of the amount of the variation. In such a case, AE control is performed until the appropriate exposure is achieved. Furthermore, when the zoom operation is completed, the reference frame position and the amount of variation are reset, and the angle of view variation is detected, with the frame at the time point of completion being a reference frame.

When, as a result of determination at step S5, the angle of view variation is larger than the first determination value, α is set as an AE control stop threshold (S7). This is a case where the entire shooting angle of view is moving because the photographer is intentionally moving the camera and shooting, for example, as with the aforementioned case of FIG. 2A. The AE control stop threshold is a threshold value for determining whether to permit or stop AE control (see S23). The threshold α is a value smaller than a threshold β described below. Since exposure control is performed to the appropriate exposure or the vicinity of the appropriate exposure when the entire shooting angle of view is moving, it suffices that the threshold α is zero or a value close thereto, and at least smaller than the threshold β.

When, on the other hand, the angle of view variation is smaller than the first determination value as a result of the determination at step S5, the amount of subject variation is calculated (S9). Here, the amount-of-motion detection section 11 detects the amount of subject position variation within the angle of view, on the basis of the image data from the image processing section 3. Here, the angle of view is divided into a plurality of blocks and the amount of subject movement is calculated for each block.

After the calculation of the amount of subject variation, it is next determined whether or not the amount of subject variation is larger than the second determination value (S11). Here, the determination is performed on the basis of whether or not the amount of subject variation within the angle of view calculated at step S9 (for example, the amount of variation of the block with the largest amount of movement in a case where a plurality of blocks has moved) is larger than the second determination value.

When particular information such as face information is used as the second determination value, the determination is performed on the basis of the size of the subject and the amount of movement of the region. When there is a large subject whose region is occupying half or more of the angle of view, for example, it is determined that the second determination value has been exceeded even if the amount of movement is small (moving to a neighboring area). When there is a plurality of subjects, each of which being small, the second determination value itself is set to a large value and it is determined that the second determination value is exceeded when there is a large amount of movement. When the shooting lens is a zoom lens, the second determination value may be altered in accordance with the focal length.

In addition, when the amount of subject variation is determined, it is detected whether or not a zoom operation has been performed and, when the subject has varied due to performing zooming, it is determined that the amount of subject variation is larger than the second determination value regardless of the amount of the variation. In such a case, AE control is performed until the appropriate exposure is achieved. Furthermore, when the zoom operation is completed, the reference frame position and the amount of variation are reset, and the variation of the amount of subject is detected, with the frame at the time point of completion being a reference frame.

When, as a result of the determination at step S11, the amount of subject variation is larger than the second determination value, the amount of brightness variation of the subject movement position is subsequently calculated (S13). Here, the amount-of-brightness-variation detection section 13 calculates the amount of brightness variation for the block with the largest amount of subject movement.

After the calculation of the amount of brightness variation of the subject movement position, it is next determined whether or not the amount of brightness variation is larger than the third determination value (S15). Here, the determination is performed on the basis of whether or not the amount of brightness variation of the subject movement position calculated at step S13 is larger than the third determination value. The amount of brightness variation is calculated as an amount of brightness variation between frames in synchronization with the video recording frame rate or a waiting frame rate. The third determination value is assumed to be at a level such that the amount of variation is determined to be large when the subject brightness has varied by 0.5 EV or more, for example. In addition, the third determination value may be determined in accordance with the appearance of the video or properties of the image sensor. In addition, when the shooting lens is a zoom lens, the third determination value may be altered in accordance with the focal length.

In addition, when the amount of brightness variation is determined, it is detected whether or not a zoom operation has been performed and, when the subject has varied due to performing zooming, it is determined that the amount of brightness variation is larger than the third determination value regardless of the amount of brightness variation. In such a case, AE control is performed until the appropriate exposure is achieved. Furthermore, when the zoom operation is completed, the reference frame position and the amount of variation are reset, and the variation of the amount of brightness is detected, with the frame at the time point of a completion being a reference frame.

When the brightness variation is larger than the third determination value as a result of the determination at step S15, the speed setting is set to Vfast (S17). Here, Vfast is set as the driving speed of the actuator for driving the aperture.

After speed setting, β is subsequently set as the AE control stop threshold (S19). This is a case where the photographer is not intentionally moving the camera but a locally existing subject is moving, as with the aforementioned case of FIG. 2B. The AE control stop threshold is a threshold value for determining whether to permit or stop AE control as described above (see S23). The threshold β is a value larger than the aforementioned threshold α, Since the entire shooting angle of view is not moving but only locally existing subjects are moving, performing exposure control to the appropriate exposure or the vicinity of the appropriate exposure causes the disorder of exposure control to be perceived as an unnatural variation of the subject brightness. In the present embodiment, when the exposure control has been performed to an extent where the exposure becomes over or under relative to the appropriate exposure by a predetermined value, exposure control is subsequently stopped.

After the setting of the AE control stop threshold at step S7 or S19, next, a difference ΔBV between the BV value at the time of previous shooting and the appropriate exposure BV value is calculated (S21). Here, the amount-of-brightness-variation detection section 13 calculates the amount of difference ΔBV between the appropriate exposure value BV calculated from the image data in the previous frame and the appropriate exposure value By calculated from the image data in the current frame.

After the calculation of the amount of difference ΔBV, it is next determined whether or not the amount of difference ΔBV is equal to or smaller than the AE control stop threshold (S23). Here, it is determined whether or not the amount of difference ΔBV calculated at step S21 by the stop determination decision section 15 is equal to or smaller than the AE control stop threshold which has been set at step S7 or S19.

When, as a result of the determination at step S23, the amount of difference ΔBV is not equal to or smaller than the AE control stop threshold, AE control is permitted (S27) Here, the AE control section 17 calculates the exposure control values (ISO sensitivity, shutter speed value, aperture value) on the basis of the image data from the imaging section 1, and performs exposure control of the shutter, the aperture, or the like on the basis of the exposure control values so as to achieve the appropriate exposure.

When AE control is permitted at step S27, exposure control is performed so as to achieve the appropriate exposure or the vicinity of the appropriate exposure when a has been set as the AE control stop threshold at step S7. When, on the other hand, β has been set as the AE control stop threshold at step S19, exposure control is performed until the exposure becomes over or under relative to the appropriate exposure by a predetermined amount.

When, on the other hand, the amount of difference ΔBV is not equal to or smaller than the AE control stop threshold as a result of the determination at step S23, AE control is stopped (S25). Here, the AE control section 17 stops performing exposure control so as to achieve the appropriate exposure on the basis of the image data from the imaging section 1.

When AE control is stopped at step S25, the amount of exposure becomes the appropriate exposure or the vicinity of the appropriate exposure when a has been set as the AE control stop threshold at step S7. When, on the other hand, β has been set as the AE control stop threshold at step S19, exposure control is stopped if the exposure becomes over or under relative to the appropriate exposure by a predetermined amount.

When the amount of subject variation is smaller than the second determination value as a result of the determination at step S11, or when the brightness variation is smaller than the third determination value as a result of the determination at step S15, the speed setting is set to be Vslow (S29). Here, Vslow is set as the driving speed of the actuator for driving the aperture. The driving speed Vslow is a driving speed which is lower than the driving speed Vfast at the aforementioned step S17.

The reason why the driving speed is set to Vslow, which is a low speed drive, at step S29 is because the camera is not moving across the entire angle of view and also the subject within the angle of view is not moving, and furthermore the amount of brightness variation of the subject within the angle of view is small, and therefore the actuator of the aperture is driven slowly. In contrast, the reason why the driving speed is set to Vfast, which is a high speed drive, at step S19 is because the camera is not moving across the entire angle of view but the subject within the angle of view is moving and also the amount of brightness variation of the subject is large, and therefore the actuator of the aperture is driven fast so that the aperture control can follow the motion of the subject.

When AE control is stopped at steps S25 and S31, or when AE control is permitted at step S27, the flow of AE control stop determination is terminated. When image data is acquired from the imaging section 1, the process is performed again from step S1.

In the flow of E control stop determination, as thus described, a local motion in the screen is detected (S9), the subject brightness is detected (S13), a local motion brightness determination value corresponding to the local motion is set (S19) and, when the local motion corresponds to or exceeds a predetermined value, exposure control is subsequently performed until the amount of exposure reaches the local motion brightness determination value (S21 to S25) and, when the amount of exposure has come closer to the appropriate exposure than the local motion brightness determination value, the exposure is adjusted to a predetermined exposure value which is different from the appropriate exposure (S21, S23, and S27).

In an embodiment of the present invention, as has been described above, exposure control is subsequently performed until the local motion brightness determination value is reached (see S21, S23, and S27 of FIG. 3) when the local motion detection section (for example, the amount-of-motion detection section 11) has detected a motion corresponding to or exceeding a predetermined value (see "large" at S11 of FIG. 3), and when the exposure has come closer to the appropriate exposure than the local motion brightness determination value, the exposure is adjusted to a predetermined exposure value which is different from the appropriate exposure (see S23 and S25 of FIG. 3)

When the subject is moving locally within the angle of view, the human eye is observing a scene with little variation and therefore perceives even a slight disorder of exposure control in the vicinity of the appropriate exposure as an unnatural image disorder. In the present embodiment, however, exposure control is performed until the vicinity of the appropriate exposure is reached (for example, until the vicinity of the AE control stop threshold β is reached) when the subject is moving locally, but is not performed to the appropriate exposure (see, for example, FIG. 2B). In the present embodiment, therefore, appropriate exposure control can be performed in accordance with the variation of shooting scene, without causing any unnatural image disorder.

Additionally, in an embodiment of the present invention, when the overall motion detection section (see, for example, the gyro 9) has detected a motion corresponding to or exceeding a predetermined value (for example, S5 "large" of FIG. 3), exposure adjustment is subsequently performed until the overall motion brightness determination value is reached (see, for example, S7, S23, S25, and S27 of FIG. 3).

When the camera is moving across the entire shooting angle of view, it appears to the human eye that the angle of view or the brightness is significantly varying and thus occurrence of a slight disorder of exposure control in the vicinity of the appropriate exposure is not perceived as an unnatural image disorder. In the present embodiment, therefore, exposure control is performed until the original appropriate exposure is achieved.

Additionally, in an embodiment of the present invention, exposure control is performed until the appropriate amount of exposure is reached (see, for example, S7, S23, and S25 of FIG. 3) when a motion detected by the overall motion detection section (see, for example, the gyro 9) corresponds to or exceeds a predetermined value (see, for example, S5 of FIG. 3), or exposure control is performed until the exposure becomes over or under relative to the appropriate amount of exposure when a motion detected by the local motion detection section (see, for example, the amount-of-motion detection section 11) corresponds to or exceeds a predetermined value, and exposure control is subsequently stopped (see, for example, S23, S25, and S27 of FIG. 3).

The human eye perceives the brightness variation of an image associated with the disorder of exposure control in a different manner depending on whether the entire shooting angle of view is moving, or a local subject within the angle of view is moving. In the present embodiment, exposure control is changed in accordance with difference of motion, and therefore it is possible to perform an appropriate exposure control in accordance with the variation of the shooting scene.

Additionally, in an embodiment of the present invention, exposure control is performed with the exposure adjustment resolution per unit time being lowered (for example, driving speed is set to a high speed at S17 of FIG. 3) when the exposure has come closer to the appropriate exposure than the local motion brightness determination value. In other words, when the amount of brightness variation is larger than a certain value, the exposure adjustment resolution is varied in accordance with the amount of variation. When the amount of variation is large, the resolution is made coarse by setting a fast aperture driving speed, allowing a motion with a fast-varying amount. When the amount of variation is small, the resolution is made finer by setting a slow speed.

Additionally, in an embodiment of the present invention, exposure control is subsequently performed for a first time period when the local motion detection section has detected a motion corresponding to or exceeding a predetermined value and, after the first time period, exposure control is performed for a second time period. In other words, time and speed available for exposure control is set by setting an amount of difference with an amount of exposure being the next target and a time to be taken to reach there, in accordance with the amount of brightness variation.

Although an embodiment of the present invention has been described using a digital camera as the shooting device, the camera may be a digital single lens reflex camera or a compact digital camera, or a camera for shooting video such as a video camera or a movie camera, or further a camera built in a mobile phone, a smartphone, a PDA (Personal Digital Assist), a personal computer (PC), a tablet-type computer, a game console etc.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An exposure control apparatus comprising:
   a processor comprising:
      a local motion detection circuit which detects a local motion in a screen;
      a brightness detection circuit which detects a subject brightness;
      a local motion brightness determination setting circuit which sets a local motion brightness determination value for a local motion; and
      an exposure adjustment circuit which, when the local motion detection circuit has detected a motion corresponding to or exceeding a predetermined value, subsequently performs exposure control until the local motion brightness determination value is reached and, when the exposure has come closer to an appropriate exposure than the local motion brightness determination value, by lowering the exposure adjustment resolution per unit time, adjusts the exposure to a predetermined exposure value which is different from the appropriate exposure.

2. The exposure control apparatus according to claim 1, further comprising:
   an overall motion detection sensor which detects an overall motion in a screen; and
   the processor further comprises an overall motion brightness determination setting circuit which sets an overall motion brightness determination value with regard to detection of an overall motion, wherein when the overall motion detection sensor has detected a motion corresponding to or exceeding a predetermined value, the exposure adjustment circuit subsequently performs exposure adjustment until the overall motion brightness determination value is reached.

3. The exposure control apparatus according to claim 2, wherein
a relation α>β holds, letting α be the overall motion brightness determination value and β be the local motion brightness determination value.

4. The exposure control apparatus according to claim 1, wherein
the exposure adjustment circuit switches the exposure adjustment resolution per unit time in accordance with the detection result by the local motion detection circuit.

5. The exposure control apparatus according to claim 1, wherein
when the local motion detection circuit has detected a motion corresponding to or exceeding a predetermined value, the exposure adjustment circuit subsequently performs exposure control for a first time period and, after the first time period, performs exposure control for a second time period.

6. An exposure control apparatus comprising:
an overall motion detection sensor which detects an overall motion in a screen;
a control circuit comprising:
    a local motion detection circuit which detects a local motion in the screen; and
    an exposure control circuit which performs exposure control until an appropriate amount of exposure is reached when a motion detected by the overall motion detection sensor corresponds to or exceeds a predetermined value, or performs exposure control until the exposure becomes over or under relative to the appropriate amount of exposure by a predetermined amount by lowering the exposure adjustment resolution per unit time, when a motion detected by the local motion detection circuit corresponds to or exceeds a predetermined value, and subsequently stops the exposure control.

7. An exposure control method comprising:
detecting a local motion in a screen;
detecting a subject brightness;
setting a local motion brightness determination value for the local motion; and
when the local motion corresponds to or exceeds a predetermined value, subsequently performing exposure control until an amount of exposure reaches the local motion brightness determination value and, when the amount of exposure has come closer to an appropriate exposure than the local motion brightness determination value, by lowering the exposure adjustment resolution per unit time, adjusting the exposure to a predetermined exposure value which is different from the appropriate exposure.

8. An exposure control apparatus comprising:
a processor comprising:
    a local motion detection section which detects a local motion in a screen;
    a brightness detection section which detects a subject brightness;
    a local motion brightness determination setting section which sets a local motion brightness determination value for a local motion; and
    an exposure adjustment section which, when the local motion detection section has detected a motion corresponding to or exceeding a predetermined value, subsequently performs exposure control until the local motion brightness determination value is reached and, when the exposure has come closer to an appropriate exposure than the local motion brightness determination value, by lowering the exposure adjustment resolution per unit time, adjusts the exposure to a predetermined exposure value which is different from the appropriate exposure.

* * * * *